United States Patent
Syed (10) Patent No.: US 11,661,366 B2
(45) Date of Patent: May 30, 2023

(54) PROCESS FOR SELENIUM REMOVAL WITH BIOLOGICAL, CHEMICAL AND MEMBRANE TREATMENT

(71) Applicant: BL Technologies, Inc., Minnetonka, MN (US)

(72) Inventor: Wajahat Hussain Syed, Burlington (CA)

(73) Assignee: BL Technologies, Inc.

(*) Notice: Subject to any disclaimer, the term of this patent is extended or adjusted under 35 U.S.C. 154(b) by 0 days.

(21) Appl. No.: 16/098,290

(22) PCT Filed: Jun. 30, 2016

(86) PCT No.: PCT/US2016/040264
§ 371 (c)(1),
(2) Date: Nov. 1, 2018

(87) PCT Pub. No.: WO2018/004582
PCT Pub. Date: Jan. 4, 2018

(65) Prior Publication Data
US 2019/0144318 A1    May 16, 2019

(51) Int. Cl.
*C02F 9/00* (2023.01)
*B01D 61/14* (2006.01)
(Continued)

(52) U.S. Cl.
CPC ............... *C02F 9/00* (2013.01); *B01D 61/14* (2013.01); *B01D 61/145* (2013.01);
(Continued)

(58) Field of Classification Search
None
See application file for complete search history.

(56) References Cited

U.S. PATENT DOCUMENTS 5,510,040 A * 4/1996 Miller .................. C02F 1/54
                                                  210/721
5,658,487 A   8/1997 Carey et al.
(Continued)

FOREIGN PATENT DOCUMENTS

CN    1449362 A    10/2003
CN    104556540 A   4/2015
(Continued)

OTHER PUBLICATIONS

Garbisu et al., "Bacterial reduction of selenite to elemental selenium," Chem. Geol., 132 (1996) 199-204 (Year: 1996).*
(Continued)

*Primary Examiner* — Chester T Barry (57) ABSTRACT

Water containing selenium, for example flue gas desulfurization (FGD) blowdown water is treated with a combination of biological and chemical treatment and membrane filtration. The biologically treated water is dosed with a dithiocarbamate compound and flocculated prior to membrane filtration. Optionally, the treatment may be enhanced with one or more adsorptive agents prior to, or in conjunction with, membrane filtration. Membrane concentrate may be re-circulated to one or more biological treatment zones. The biological treatment may be by way of suspended growth, fixed growth on a moving bed, or both. One or more biological treatment zones may be controlled considering their oxygen reduction potential (ORP). Optionally, the biological treatment includes an aerobic zone following one or more anoxic or anaerobic zones. The non-aerobic zones remove selenium and optionally nitrogen and sulfur. The aerobic zone removes carbon, which may include carbon added as a nutrient in a non-aerobic zone.

12 Claims, 4 Drawing Sheets

(51) Int. Cl.
   *B01D 61/16*   (2006.01)
   *B01D 61/58*   (2006.01)
   *C02F 1/44*   (2023.01)
   *C02F 1/56*   (2023.01)
   *C02F 3/28*   (2023.01)
   *C02F 101/10*   (2006.01)
   *C02F 103/18*   (2006.01)

(52) U.S. Cl.
   CPC ........... *B01D 61/147* (2013.01); *B01D 61/16* (2013.01); *B01D 61/58* (2013.01); *C02F 1/444* (2013.01); *C02F 1/56* (2013.01); *C02F 3/28* (2013.01); *C02F 2101/106* (2013.01); *C02F 2103/18* (2013.01); *C02F 2209/04* (2013.01)

(56) References Cited

U.S. PATENT DOCUMENTS

| | | | | |
|---|---|---|---|---|
| 6,033,572 | A * | 3/2000 | Yano | C02F 3/28 210/631 |
| 7,413,654 | B2 | 8/2008 | Applegate et al. | |
| 8,003,071 | B2 * | 8/2011 | Prokisch | C01B 19/02 977/773 |
| 8,282,835 | B2 * | 10/2012 | Schwarz | C02F 1/5236 210/722 |
| 9,833,741 | B2 * | 12/2017 | Roh | B01D 63/16 |
| 10,047,378 | B2 * | 8/2018 | Yamashita | C02F 3/006 |
| 2007/0114174 | A1 * | 5/2007 | Peeters | C02F 3/302 210/605 |
| 2007/0163958 | A1 * | 7/2007 | Newcombe | C02F 1/44 210/650 |
| 2009/0283472 | A1 * | 11/2009 | Gerardi | C02F 3/101 210/615 |
| 2010/0176053 | A1 * | 7/2010 | Adams | C02F 3/341 210/614 |
| 2010/0264083 | A1 * | 10/2010 | Biesinger | C02F 3/006 210/622 |
| 2010/0300963 | A1 * | 12/2010 | Peeters | C02F 3/06 210/610 |
| 2011/0042320 | A1 * | 2/2011 | Allen | C02F 1/001 210/724 |
| 2011/0290666 | A1 * | 12/2011 | Vogler | C02F 9/00 205/742 |
| 2013/0213883 | A1 * | 8/2013 | Josse | C02F 3/302 210/601 |
| 2014/0263043 | A1 * | 9/2014 | Mehta | C02F 9/00 210/601 |
| 2015/0034552 | A1 | 2/2015 | Pickett et al. | |
| 2017/0266670 | A1 * | 9/2017 | Stein | B03C 1/01 |

FOREIGN PATENT DOCUMENTS

| | | | |
|---|---|---|---|
| CN | 105645668 A | 6/2016 | |
| EP | 0891951 A1 * | 1/1999 | ............... C02F 3/28 |
| WO | 2007012181 A1 | 2/2007 | |
| WO | 2007079215 A3 | 11/2007 | |

OTHER PUBLICATIONS

European Application No. 16738962.6, Communication pursuant to Article 94(3), dated Jan. 29, 2020.

European Application No. 16738962.6, Intention to Grant, dated Apr. 30, 2020.

International Application No. PCT/US2016/040264, International Preliminary Report on Patentability dated Jan. 10, 2019.

International Patent Application No. PCT/US2016/040264, International Search Report and Written Opinion dated Nov. 16, 2016.

Chinese Patent Application No. 201680087285.4, Office Action dated Apr. 9, 2021.

Chinese Patent Application No. 201680087285.4, Office Action dated Oct. 11, 2021.

Chinese Patent Application No. 201680087285.4, Office Action dated Apr. 11, 2022.

* cited by examiner

PROCESS FOR SELENIUM REMOVAL WITH BIOLOGICAL, CHEMICAL AND MEMBRANE TREATMENT

CROSS-REFERENCE TO RELATED APPLICATIONS

This application is a National Stage Entry of International Application No. PCT/US2016/040264, filed Jun. 30, 2016, which is incorporated by reference.

FIELD

This application relates to wastewater treatment and selenium removal.

BACKGROUND

International Publication Number WO 2007/012181, Apparatus and Method for Treating FGD Blowdown or Similar Liquids, describes a process with steps of aerobic treatment to remove COD and nitrify a waste stream, anoxic treatment to denitrify a waste stream, anoxic treatment to remove selenium and anaerobic treatment to remove heavy metals and sulfur. In some examples, the process includes membrane separation of the waste stream upstream of the anoxic digestion to remove selenium. Anoxic digestion to remove selenium occurs in a fixed film reactor having a granular activated carbon (GAC) bed.

US Patent Application Publication Number 2014/0263043, S/M for Biological Treatment of Wastewater with Selenium Removal, describes a method including a chemical and biological treatment to convert soluble selenium species into insoluble elemental selenium. The elemental selenium is trapped in an activated carbon filter bed.

INTRODUCTION

This specification describes a system and process for removing selenium from water, for example flue gas desulfurization (FGD) blowdown water. The water is treated with a combination of biological treatment, chemical treatment and membrane filtration. Biologically treated water is dosed with a dithiocarbamate compound and optionally flocculated prior to membrane filtration. Optionally, the treatment may be enhanced with one or more adsorptive agents prior to, or in conjunction with, membrane filtration. The biological treatment includes converting soluble species of selenium to elemental selenium. The membranes may provide secondary separation of the biologically treated water, for example as in a membrane bioreactor, or the membranes may treat an effluent from the biological treatment.

The biological treatment occurs in one or more reactors or zones. The reactors may be controlled considering their oxygen reduction potential (ORP). Negative ORP is maintained in one or more anoxic or anaerobic zones to provide conditions suitable for reducing soluble selenium species, and optionally nitrogen or sulfur species, or a combination. The biological treatment may be by way of suspended growth, fixed growth on a moving bed, or both, which are not prone to nitrate fouling or scaling. Optionally, the biological treatment includes an aerobic zone following one or more anoxic or anaerobic zones. The aerobic zone removes carbon, which may include carbon added as a nutrient in a non-aerobic zone.

DETAILED DESCRIPTION

Water containing selenium is treated with a combination of biological, chemical and membrane treatment. The biological treatment can contain one or more process zones. A membrane filtration unit may provide secondary separation of mixed liquor into waste and activated sludge and an effluent from the biological treatment. Alternatively, the membrane filtration unit may provide tertiary separation of a biologically treated effluent. Solids separated by the membrane include selenium. The separated selenium may be in the form of, or contained in, one or more of elemental (insoluble) selenium, a precipitate, floc, or an absorptive particle.

Influent water may be pre-treated before being treated to remove selenium. Pre-treatment may include, for example, primary separation of suspended solids and optionally one or more of ammonia stripping, dilution, pH adjustment, softening or scalant removal. For example, calcium salts may be removed from influent water to help prevent downstream scaling. The influent water may also flow through an equalization tank to help provide a more nearly constant flow rate through the selenium removal process.

The biological process zones include at least one anoxic or anaerobic zone. Optionally, each process zone may occupy a physically separate mixed region, for example a tank or a divided region within a tank. Oxygen reduction potential (ORP) may be controlled in the process zone or zones to provide at least one zone suitable for the reduction of soluble selenium species such as selenate or selenite to elemental selenium. A biological process zone may be referred to as a reactor.

A system may have an anoxic reactor in which ORP is maintained in a range from 0 mv to −350 mv. In this reactor, nitrates are removed through de-nitrification processes via microorganisms if nitrates are present in the feedwater. Selenate and selenite can also be reduced in this reactor. Sulfate, if present in the feedwater, may also be reduced. Nutrients can be added to the anoxic reactor to allow for, or enhance, the biological removal of one or more selected constituents in the water. To help ensure adequate enzymatic activity of facultative anaerobes, the pH in an anoxic reactor is optionally maintained in the range of about 6.0 to 8.5.

Alternatively or additionally, a system may have an anaerobic reactor. In a system with both an anoxic reactor and an anaerobic reactor, the anaerobic reactor is located downstream of the anoxic reactor. ORP in the anaerobic reactor is maintained in a range from −50 mv to −500 mv or −100 mv to −500 mv. This range supports the growth of sulfate reducing bacteria (SRB), which can further transform constituents such as selenate, selenite, and sulfate to elemental forms. Nutrients can be dosed into the anaerobic reactor to support the microorganisms. The nutrients can include one or more of carbon, phosphorus, nitrogen and trace amounts of one or more metals.

The anoxic or anaerobic reactor, or both, contains selenium-reducing microorganisms. Such microorganisms occur in nature and may spontaneously populate the reactor. Optionally, a reactor may be seeded with selenium-reducing microorganisms.

The effluent from the anoxic or anaerobic reactor can be treated further in an aerobic reactor. ORP in the aerobic reactor is maintained in a range from 100 mv to −100 mv. The aerobic reactor can remove residual organic compounds in the water or organic carbon that was dosed into the water to control the ORP in an upstream reactor. Particularly when coupled with membrane filtration, the aerobic reactor helps reduce total suspended solids (TSS) and total organic carbon (TOC) concentrations in the final effluent.

Water flowing through the biological treatment zone or zones may be referred to as mixed liquor. The mixed liquor is treated by way of separation downstream of the biological treatment, with a recycle of a portion of the separated sludge. This secondary separation may be performed by membranes, for example microfiltration (MF) or ultrafiltration (UF) membranes, or by another separation device such as a clarifier. When membranes provide secondary separation, the membranes may be immersed in a biological reactor, immersed in a separate tank, or provided in pressure vessels. Optionally, a MF, UF or other membrane (i.e. a nanofiltration or reverse osmosis membrane) may be used to treat effluent from a secondary separation unit, particularly when the secondary separation unit does not include membranes.

To help improve solid separation or filterability of the water, one or more chemicals, such as a pH-adjusting agent, coagulant or precipitant, can be added to the mixed liquor or secondary effluent prior to membrane filtration. If an aerobic reactor is used, the chemicals can be added in the aerobic reactor upstream of the secondary separation unit. If an aerobic reactor is not used, the chemicals can be added through one or more in-line mixers or tanks upstream of the secondary separation unit. Alternatively, if membranes are provided downstream of the secondary separation unit, the chemicals can be added through one or more in-line mixers or tanks upstream of the membrane unit. Tanks can include a combination of a mixing tank and a flocculation tank.

The one or more chemicals can include a coagulant, for example $FeCl_3$ or alum. The dosage of the coagulant may be 1 to 100 ppm. The one or more agents can alternatively or additionally include a dithiocarbamate compound. Optionally, the dithiocarbamate compound is in the form of an anionic polymer, for example a polymeric dithiocarbamate acid salt composition. Suitable polymeric dithiocarbamate acid salt compositions are described in U.S. Pat. No. 5,658,487, which is incorporated by reference herein. Polydithiocarbamic acid salts described in U.S. Pat. No. 5,658,487 have the formula:

wherein $R^1$ is independently an organic radical or wherein $R^4$ is independently an organic radical and x=1 to 5; $R^2$ is independently —H or —$CS_2R^5$, $R^5$ is independently H or a cation; $R^3$ is N or a substituted organic radical; Z is independently N—$R^2$, O or S; the sum of n is an integer greater than 10; and m is an integer greater than 2.

In one example of such a polydithiocarbamic acid salt, $R^1$ is an ethylene radical, the sum of n is greater than 10, m=3, $R^3$=N, >50% of $R^2$ are —$CS_2R^5$, $R^5$ is an alkali metal and Z is N—$R^2$. In another example of such a polydithiocarbamic acid salt, $R^1$ is an ethylene radical, the sum of n is greater than 25, m=3, $R^3$=N, >50% of $R^2$ are —$CS_2R^5$, $R^5$ is an alkali metal and Z is N—$R^2$. In another example of such a polydithiocarbamic acid salt, $R^1$ is an ethylene radical, the sum of n is greater than 25, m=3, $R^3$=N, >79% of $R^2$ are —$CS_2R^5$, $R^5$ is an alkali metal and Z is N—$R^2$. In another example, a polymeric metal removal is prepared by reacting poly[ethyl-eneimine] (PEI) with carbon disulfide ($CS_2$) in the presence of a base, with 80% $CS_2$ functionalization and a molecular weight of about 170,000 Da.

Suitable dithiocarbamate compounds are also available as METCLEAR products from GE Water & Process Technologies. For example, METCLEAR MR 2405 is a liquid anionic polymer with a poly dithiocarbamate. METCLEAR products or other dithiocarbamate polymers may be used at about 1-20, or 5-10, ppm per ppm of selenium in the water being treated. METCLEAR MR2405 is particularly effective when selenium is present in the selenite ($SeO_3^{2-}$) form.

The water can also be treated with one or more adsorptive agents upstream of membrane filtration. One suitable agent is powdered activated carbon (PAC). A suitable commercially available agent is MACARRIER from GE Water & Process Technologies. MACARRIER is a carbon-based adsorbant that is safe for contact with immersed membranes and can be added directly in a membrane tank. If a more abrasive adsorbant is used, the adsorbant is preferably filtered out before the water contacts a membrane.

Sludge containing separated solids is recycled back from the secondary separation unit to one or more biological reactors. For example, sludge may be recycled back to an aerobic reactor at 1 to 5 times the flow rate Q of influent to the selenium treatment process. 1-2 Q of sludge may be recycled back to an anoxic reactor. A portion of the sludge is wasted, which can remove at least some selenium from the system.

The membranes can be, for example, ZEEWEED 500 modules sold by GE Water & Process Technologies. These are immersed, hollow fiber membranes with a nominal pore size of about 0.04 microns. These are UF membranes, or both UF and MF membranes, depending on the classification system used.

The biological reactors contain suspended growth or fixed growth on a moving, optionally fluidized, bed, or a combination such as an integrated fixed-film activated sludge (IFAS) reactor. If the influent water contains both nitrate and soluble selenium ions, the nitrate will be reduced first. Some selenium containing water also contains one or more scale forming contaminants. In a fixed bed reactor, nitrate reduction or scaling can foul the bed leading to high head loss through the reactor or require more extensive pre-treatment. A reactor without a fixed bed, for example a suspended growth reactor, is less prone to these problems and can accept influent with a higher nitrate concentration. Optionally, a fixed bed reactor can be used after the selenium removal process described herein to provide further selenium removal in a polishing step. In this case, nitrate and scalants have been removed upstream of the fixed bed reactor and bed fouling is less of a concern. A suitable fixed bed reactor is the ABMET reactor available from GE Water & Process Technologies.

Figure 1:
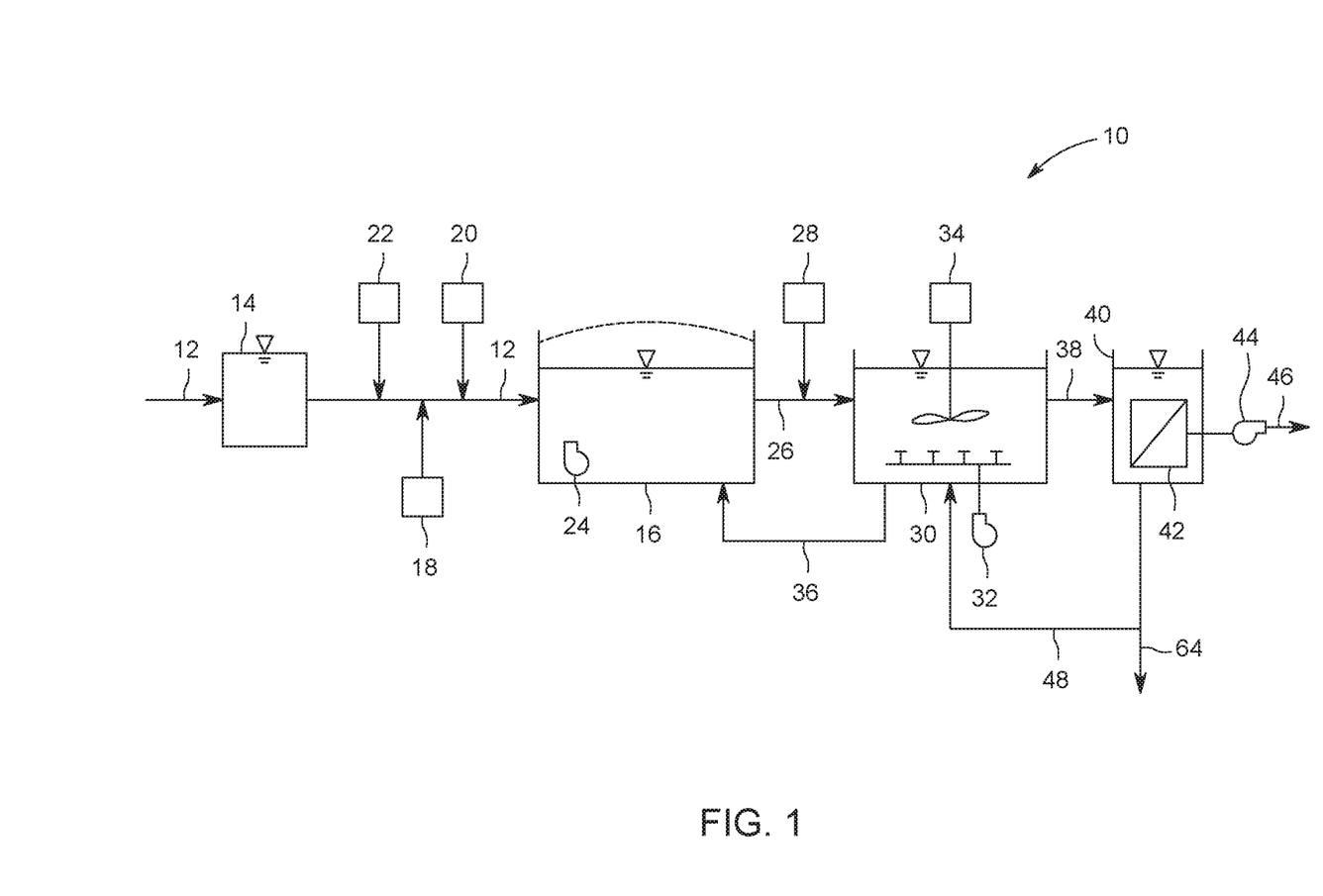
FIG. 1 is a process flow diagram for a first water treatment system.

FIG. 1 shows a first treatment system 10. Water 12 containing selenium flows into an equalization tank 14. The water 12 is pumped from the equalization tank 14 to a bioreactor tank 16. HCl 22 is added to the water 12 as required to provide a target pH, for example 6.0 to 8.5 or 6.5 to 7.0. Nutrients 18 are added to the water 12 as required to support growth of selenium-reducing microorganisms in the bioreactor tank 16. The nutrients 18 may include a carbon source, for example, one of the MICROC products sold by EOSi. The feed rate of the nutrients 18 may also be adjusted to help achieve a target ORP in the bioreactor tank. Phosphoric acid 20 is also added to the water 12.

The bioreactor tank 16 is operated at an ORP of −100 to −500 mv. The bioreactor tank 16 may be considered either an anoxic tank or an anaerobic tank. A mixer 24, in this example a submersible pump, is used to mix the contents of the bioreactor tank. The bioreactor tank 16 thereby operates as a continuously stirred tank reactor (CSTR). Mixed liquor 26 from the bioreactor tank 16 is pumped to an aeration tank 30. A coagulant 28, in this example 60 mg/L ferric chloride, is added to the mixed liquor 26. The aeration tank 30 is supplied with air from a blower 32 and operated at an ORP of 100 mv to −100 mv. Mechanical mixers 34 stir the contents of the aeration tank 30. A mixed liquor recycle stream 36 flows from the aeration tank 30 to the bioreactor tank 16.

Biologically treated effluent 38 flows from the aeration tank 30 to a membrane tank 40. The membrane tank 40 has an immersed membrane module 42, in this example a ZEEWEED 500 module. Permeate 46 is drawn through the membrane module 42 by permeate pump 44. Return activated sludge (RAS) 48 flows from the membrane tank 48 to the aeration tank 30. Waste activated sludge (WAS) 64, which contains selenium, is removed from the system 10.

Figure 2:
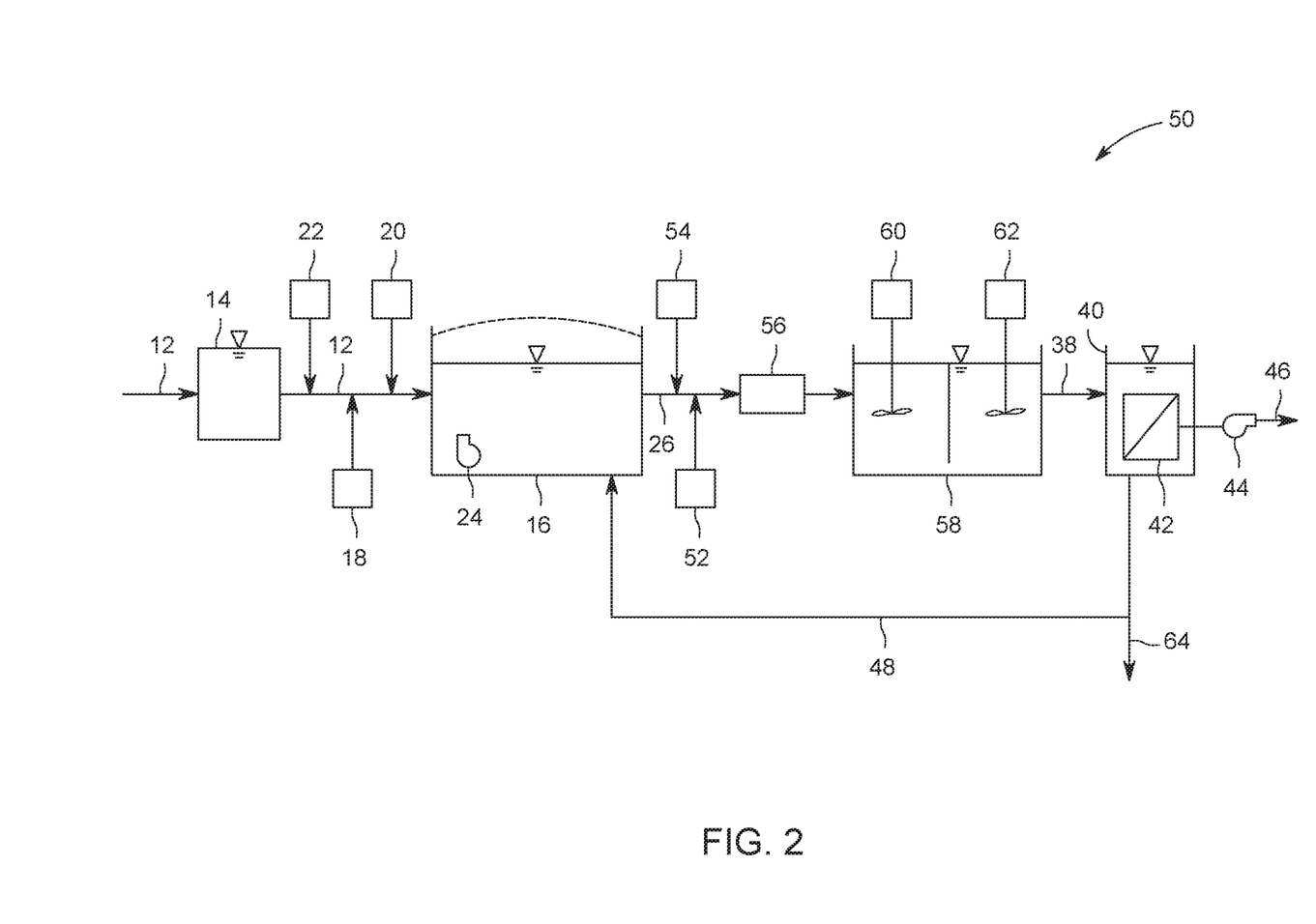
FIG. 2 is a process flow diagram for a second water treatment system.

FIG. 2 shows a second system 50. The second system 50 shares some of the same components as the first system 10, as indicated by the use of the same reference numbers. Second system 50 may also optionally include any components of first system 10 that are not shown in FIG. 2 and components of the second system 50 may optionally be used in the first system 10.

Second system 50 has an additional flocculation tank 58 between the bioreactor tank 16 and the membrane tank 40. In the example shown, flocculation tank 58 is divided internally into an upstream section with high energy mixer 60 and a downstream low energy mixer 62. Alternatively, other forms of flocculation tank may be used. Upstream of the flocculation tank 58, a pH adjusting agent 54 and a dithiocarbamate compound 52 are added to the mixed liquor 26. Optionally, these chemicals may be pre-mixed in in-line mixer 56 before entering the flocculation tank 58. Waste activated sludge (WAS) 64, which contains selenium, is removed from the second system 50.

Figure 3:
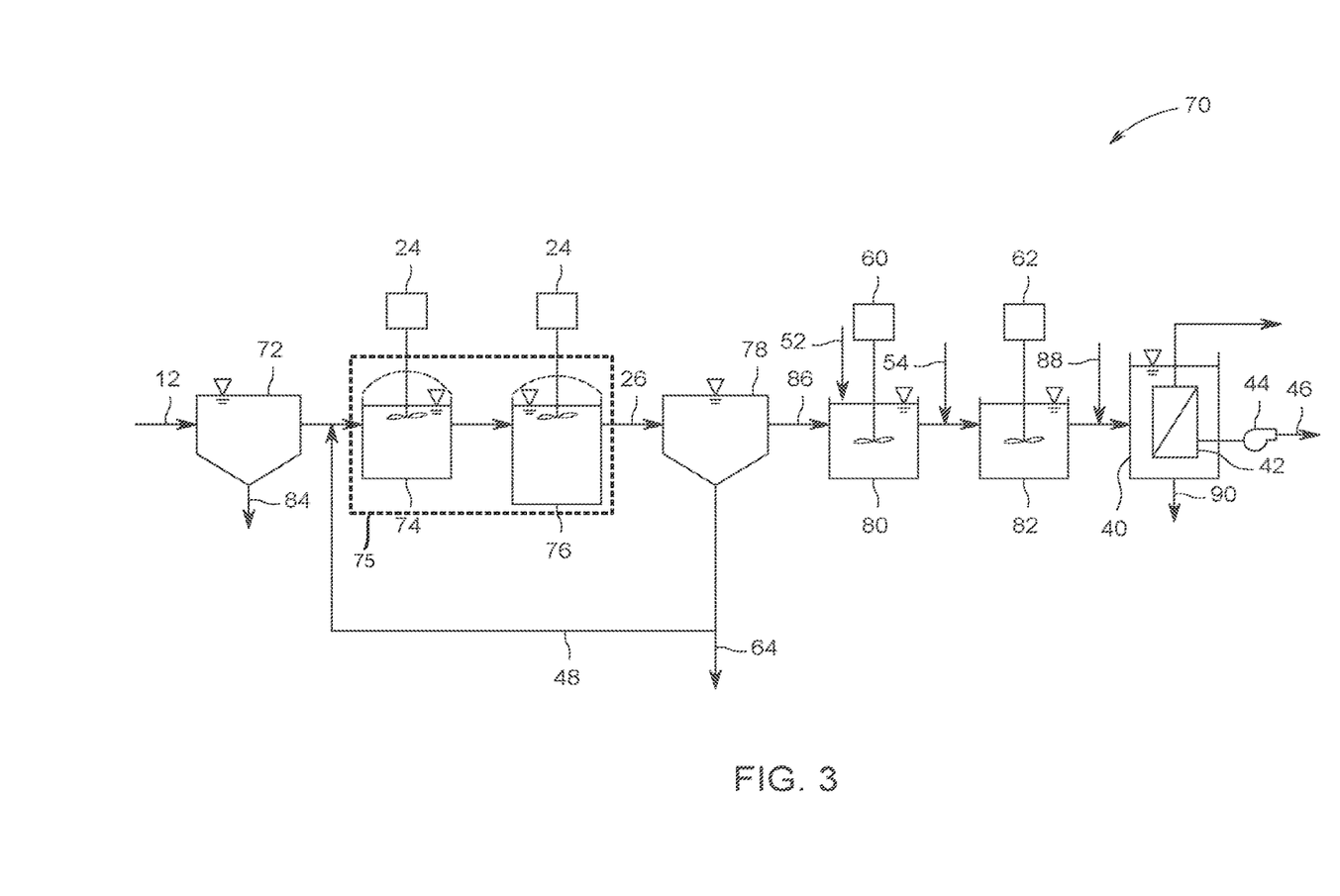
FIG. 3 is a process flow diagram for a third water treatment system.
Figure 4:
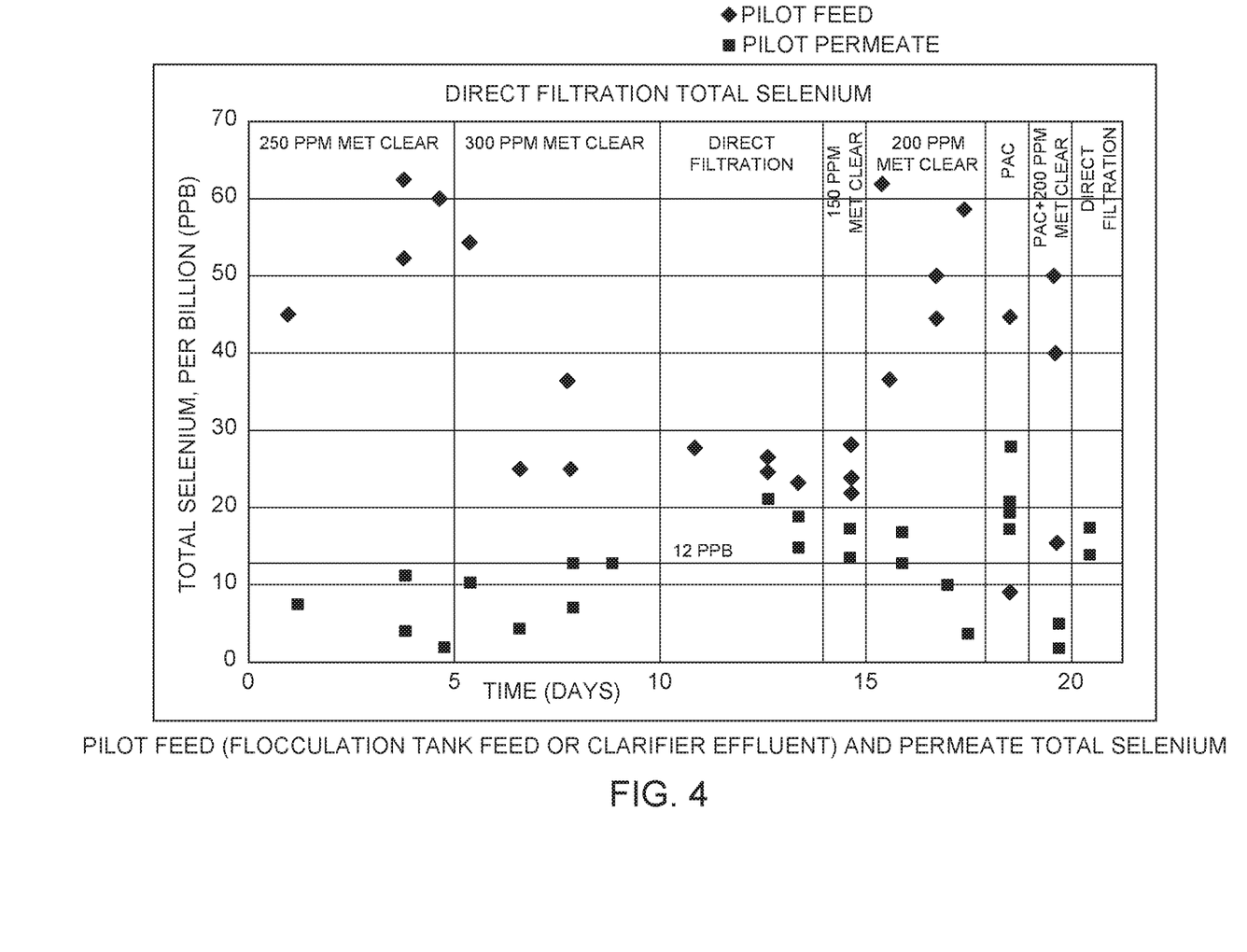
FIG. 4 shows results of a pilot test using a system as in FIG. 2.

FIG. 3 shows a third treatment system 70. The second third system 70 shares some of the same components as the first system 10 and second system 50, as indicated by the use of the same reference numbers. Third system 70 may also optionally include any components of first system 10 and second system 50 that are not shown in FIG. 3, and components of the third system 70 may optionally be used in the first system 10 or second system 50.

Water 12 containing selenium is treated in one or more preliminary treatment units 72. The preliminary treatment unit may provide physical, chemical, or combined physical and chemical treatment. In the example shown, a lime softener produces sludge 84 including suspended solids and calcium which is removed from the third system 70. One or more preliminary treatment units 72 may also be provided with the system 10 or second system 50.

The water 12 continues into a bioreactor 75. The bioreactor 75 may be a bioreactor tank 16 as described above. In the example shown, however, the bioreactor 75 includes an anoxic tank 74 and an anaerobic tank 76. The anoxic tank 74 has ORP maintained in a range from 0 mv to −350 mv. ORP in the anaerobic tank 76 is maintained in a range from −100 mv to −500 mv. HCl or another agent may be added to the water 12 upstream or in the anoxic tank 12 as required to provide a target pH, for example 6.0 to 8.5 or 6.5 to 7.0. Nutrients may be added to the water 12 as required to support growth of selenium-reducing microorganisms upstream of or in the anoxic tank 74, upstream of or in the anaerobic tank 76, or both. Mixers 24 in this example are motor driven paddle mixers, although submersible pumps may also be used as described above.

Mixed liquor 26 in the bioreactor 75 flows to a secondary separation unit 78, which is a clarifier in the example shown. The secondary separation unit provides RAS 48 and WAS 64. RAS 48 is re-circulated within the bioreactor 75. RAS 64 is removed from the third system 70.

Effluent 86 from the bioreactor 75 is treated in a rapid mixing tank 80 and slow mixing tank 82, which are alternatives to the combined flocculation tank 58 of the second system 50. A dithiocarbamate compound 52 is added into the effluent 86 in the rapid mixing tank 80. The dithiocarbamate compound 52 can be added directly into the rapid mixing tank 80 as shown or into a pipe leading to the rapid mixing tank 80, for example through an in-line mixer. A pH adjusting agent 54 is added to effluent 86 in the slow mixing tank 82, or alternatively to the rapid mixing tank 80.

Effluent 86 continues to a membrane tank 40. Optionally, an adsorbent 88 can be added to the effluent 86 upstream of the membrane module 42. Waste sludge 90 is removed from the membrane tank 40.

EXAMPLES

A pilot system as shown in FIG. 1 was used to treat blowdown wastewater from a wet limestone flue gas desulfurization system at a coal-fired power plant. The anoxic reactor was completely mixed and operated at an ORP of −100 to −500 mv. The system removed about 50% of the selenite and selenate in the feedwater and also removed 75 ppm of nitrate.

A second pilot system as shown in FIG. 2 was used to treat the same FGD wastewater. The anoxic reactor was again completely mixed and operated at an ORP of −100 to −500 mv. Effluent from the anoxic reactor was fed to a clarifier. Settled sludge from the clarifier was recirculated back to the anoxic reactor. Effluent from the clarifier was pumped into a flocculation tank.

Two chemicals were added to the flocculation tank, hydrochloric acid for pH control (target of 7) and METCLEAR MR2405. Both chemicals were added upstream of inline static mixers leading to the flocculation tank. The flocculation tank had two zones. The first zone was a rapid mixing zone with a large low energy mixer as well as a small high energy mixer to achieve good coagulation. The second zone had a large low energy mixer to allow flocculation to occur. To maintain a constant residence time, the flocculation tank was operated with a continuous of feed of 1.5 gpm. 1 gpm of the flow was fed on-demand to a membrane tank. Excess water was allowed to overflow from the flocculation tank.

The membrane tank contained a ZW500 immersed membrane module. This module contains PVDF based hollow fiber membranes with a nominal 0.04 micron pore size, which may be classified as either UF or MF membranes. The membrane filtration process used sequential membrane aeration and backwashing to maintain membrane permeability.

Powdered activated carbon (PAC) was added to the flocculation tank and the membrane tank for short periods of time.

Jar tests of METCLEAR 2405 (alternatively called MR 2405) were conducted using various dosages from 50 to 200 ppm at pH of 7 followed by filtration with 0.45 micron filter. The jar tests showed that a 60% removal of selenium was possible with 200 ppm of MR2405 and a 0.45 micron filter. The jar tests also suggested that higher dosages could achieve further removal.

The pilot unit was operated under the following conditions:
250 ppm MR2405 dosed to flocculation tank
300 ppm MR2405 dosed to flocculation tank
membrane filtration with no chemical addition
150 ppm MR2405 dosed to flocculation tank
200 ppm MR2405 dosed to flocculation tank
membrane filtration with PAC added to flocculation tank and membrane tank at 1 g/L
200 ppm MR2405 with 1 g/L of PAC added to flocculation tank and membrane tank.

Total selenium results for the feed water to the flocculation tank (i.e. clarifier effluent) and permeate streams are presented in FIG. 3. The selenium concentration in the feed water ranged from 9 to 62 ppb with an average of 35 ppb. The selenium speciation of the feed water showed that selenium in the form of selenite ($SeO_3^{2-}$) was between 36% and 100%, averaging 84%, of the total dissolved selenium. The remaining selenium was in the form of selenate ($SeO_4^{2-}$).

The target was 12 ppb selenium in the permeate. Better than target selenium removal was achieved with 250-300 ppm of METCLEAR MR2405 dosed into the flocculation tank. Selenium concentration at or below 12 ppb was also achieved with the exception of one reading at 16 ppb when 200 ppm of MR2405 was dosed into the flocculation tank. Selenium concentration at or below 12 ppb was also achieved when 200 ppm of MR2405 was dosed and 1 g/L of PAC was present in the system. Using 200 ppm of the MR2405 with 1 g/of the PAC was also able to achieve effluent selenium concentration below 5 ppb even though the use of PAC without MR 2405 did not show a significant improvement. Dosages of 200 ppm and above of METCLEAR MR2405 combined with ultrafiltration were able to produce treated water that, on average, met or exceeded the 12 ppb selenium concentration target. Based on the selenium speciation results of the permeate stream, it is likely that the METCLEAR had the greatest effect on selenium in the selenite form. The selenate fraction changed very little through the process whereas a material reduction was observed in the selenite fraction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A process for removing selenium from water comprising the steps of,
    a) treating the water with microorganisms in a suspended growth or moving bed or both in one or more biological process reactors or zones including at least one anoxic or anaerobic reactor or zone;
    b) treating the water with a dithiocarbamate compound;
    c) separating the water downstream of step (a) to produce a sludge and an effluent; and,
    d) recycling a portion of the separated sludge as activated sludge to one or more of the biological process reactors or zones,
    wherein (e) the step of separating the water includes filtering the water through a microfiltration or ultrafiltration membrane to produce the sludge and the effluent or (f) the effluent is filtered through a microfiltration or ultrafiltration membrane,
    wherein step b) occurs upstream of the microfiltration or ultrafiltration membrane,
    and wherein step a) includes converting soluble species of selenium to elemental selenium,
    and further comprising flocculating the water between steps b) and c).

2. The process of claim 1 wherein the dithiocarbamate compound is a polymeric dithiocarbamate acid salt composition.

3. The process of claim 2 wherein the polymeric dithiocarbamate acid salt composition has the formula:

wherein $R^1$ is independently an organic radical or wherein $R^4$ is independently an organic radical and x=1 to 5; $R^2$ is independently —H or —$CS_2R^5$, $R^5$ is independently H or a cation; $R^3$ is N or a substituted organic radical; Z is independently N-$R^2$, O or S; the sum of n is an integer greater than 10; and m is an integer greater than 2.

4. The process of claim 1 wherein the water is flue gas desulfurization (FGD) blowdown water.

5. The process of claim 1 wherein at least one of the one or more reactors or zones in step a) is maintained at an ORP between −100 mv and −500 mv.

6. The process of claim 1 wherein the step of separating the water includes filtering the water through a microfiltration or ultrafiltration membrane to produce the sludge and the effluent and the sludge is re-circulated to step a).

7. The process of claim 1 comprising a step of primary separation prior to step a).

8. The process of claim 1 comprising adjusting the pH of the water to be in the range of 6.0 to 7.0 before treating the water with a dithiocarbamate compound.

9. A process for removing selenium from water comprising the steps of,
    a) treating the water with microorganisms in a suspended growth or moving bed or both in one or more biological process reactors or zones including at least one anoxic or anaerobic reactor or zone;
    b) treating the water with a dithiocarbamate compound;
    c) separating the water downstream of step (a) to produce a sludge and an effluent; and, d) recycling a portion of the separated sludge as activated sludge to one or more of the biological process reactors or zones, wherein (e) the step of separating the water includes filtering the water through a microfiltration or ultrafiltration membrane to produce the sludge and the effluent or (f) the effluent is filtered through a microfiltration or ultrafiltration membrane, wherein step b) occurs upstream of the microfiltration or ultrafiltration membrane, and wherein step a) includes converting soluble species of selenium to elemental selenium, and further comprising treating the water with an adsorptive agent upstream of the microfiltration or ultrafiltration membrane.

10. The process of claim 9 wherein the adsorptive agent comprises powdered activated carbon.

11. A process for removing selenium from water comprising the steps of, a) treating the water with microorganisms in a suspended growth or moving bed or both in one or more biological process reactors or zones including at least one anoxic or anaerobic reactor or zone;

b) treating the water with a dithiocarbamate compound;

c) separating the water downstream of step (a) to produce a sludge and an effluent; and, d) recycling a portion of the separated sludge as activated sludge to one or more of the biological process reactors or zones, wherein (e) the step of separating the water includes filtering the water through a microfiltration or ultrafiltration membrane to produce the sludge and the effluent or (f) the effluent is filtered through a microfiltration or ultrafiltration membrane, wherein step b) occurs upstream of the microfiltration or ultrafiltration membrane, and wherein step a) includes converting soluble species of selenium to elemental selenium, and wherein step a) occurs in at least two reactors or zones including an upstream one maintained at an ORP between 0 mv and −350 mv and a downstream one maintained at an ORP between −50 mv and −500 mv.

12. A process for removing selenium from water comprising the steps of, a) treating the water with microorganisms in a suspended growth or moving bed or both in one or more biological process reactors or zones including at least one anoxic or anaerobic reactor or zone;

b) treating the water with a dithiocarbamate compound;

c) separating the water downstream of step (a) to produce a sludge and an effluent; and, d) recycling a portion of the separated sludge as activated sludge to one or more of the biological process reactors or zones, wherein (e) the step of separating the water includes filtering the water through a microfiltration or ultrafiltration membrane to produce the sludge and the effluent or (f) the effluent is filtered through a microfiltration or ultrafiltration membrane, wherein step b) occurs upstream of the microfiltration or ultrafiltration membrane, and wherein step a) includes converting soluble species of selenium to elemental selenium, and wherein step a) occurs in at least two reactors or zones including an upstream one maintained at an ORP between −50 mv and −500 mv and a downstream one maintained at an ORP between −100 mv and +100 my.

* * * * *